(12) United States Patent
Vassilieff et al.

(10) Patent No.: US 10,819,157 B2
(45) Date of Patent: Oct. 27, 2020

(54) METHOD FOR CHARGING A MOBILE TERMINAL WITH A MOBILE DEVICE WITH WHICH A MOTOR VEHICLE IS INTENDED TO BE EQUIPPED AND ASSOCIATED CHARGING DEVICE

(71) Applicants: Continental Automotive France, Toulouse (FR); Continental Automotive GmbH, Hannover (DE)

(72) Inventors: Youri Vassilieff, Toulouse (FR); Mohamed Cheikh, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/342,236

(22) PCT Filed: Dec. 12, 2017

(86) PCT No.: PCT/FR2017/053515
§ 371 (c)(1),
(2) Date: Apr. 16, 2019

(87) PCT Pub. No.: WO2018/109358
PCT Pub. Date: Jun. 21, 2018

(65) Prior Publication Data
US 2020/0059115 A1 Feb. 20, 2020

(30) Foreign Application Priority Data
Dec. 13, 2016 (FR) .................................. 16 62355

(51) Int. Cl.
*H02J 50/10* (2016.01)
*H02J 50/12* (2016.01)
(Continued)

(52) U.S. Cl.
CPC .............. *H02J 50/12* (2016.02); *H01F 38/14* (2013.01); *H01Q 1/243* (2013.01); *H02J 50/80* (2016.02);
(Continued)

(58) Field of Classification Search
CPC .. H02J 50/12; H02J 50/80; H02J 50/90; H02J 50/10; H02J 7/0044; H01F 38/14;
(Continued)

(56) References Cited

U.S. PATENT DOCUMENTS

2009/0243397 A1    10/2009   Cook et al.
2010/0156347 A1     6/2010   Lee et al.
(Continued)

FOREIGN PATENT DOCUMENTS

EP           2919357 A1     9/2015
EP           3089320 A1    11/2016
WO   WO-2015087399 A1 *   6/2015 ............ B60L 53/305

OTHER PUBLICATIONS

English Translation of the Written Opinion for International Application No. PCT/FR2017/053515, dated Jan. 29, 2018, 5 pages.
(Continued)

*Primary Examiner* — Pinping Sun
(74) *Attorney, Agent, or Firm* — RatnerPrestia

(57) ABSTRACT

A charging device housed on board a motor vehicle includes at least one "WPC" inductive primary antenna, having a charging frequency, and a second "A4WP" resonant primary antenna, having a resonant frequency at least 1000 times higher than the charging frequency, a ferromagnetic body situated below and joined to the inductive antenna. The method for charging a mobile terminal includes: equipping the ferromagnetic body and inductive antenna beforehand with a system able to move the ferromagnetic body and inductive antenna with respect to the resonant antenna,
(Continued)

moving the ferromagnetic body associated with the inductive antenna with respect to the resonant antenna, depending on the resonant frequency of the resonant antenna when the mobile terminal is charged by the resonant antenna, and moving the ferromagnetic body associated with the inductive antenna depending on the charging efficiency of the inductive antenna when the mobile terminal is charged by the inductive antenna.

11 Claims, 3 Drawing Sheets

(51) Int. Cl.
*H02J 50/80* (2016.01)
*H02J 50/90* (2016.01)
*H01F 38/14* (2006.01)
*H01Q 1/24* (2006.01)
*H04B 5/00* (2006.01)

(52) U.S. Cl.
CPC ............ *H02J 50/90* (2016.02); *H04B 5/0037* (2013.01); *H04B 5/0081* (2013.01); *H01F 2038/146* (2013.01)

(58) Field of Classification Search
CPC .......................... H01F 2038/146; H01Q 1/243; H04B 5/0037; H04B 5/0081
See application file for complete search history.

(56) References Cited

U.S. PATENT DOCUMENTS

| | | |
|---|---|---|
| 2012/0212074 A1 | 8/2012 | Uchida |
| 2013/0162220 A1* | 6/2013 | Iijima .................... H02J 50/80 320/137 |
| 2015/0115723 A1 | 4/2015 | Levo et al. |
| 2015/0263535 A1* | 9/2015 | Bae ......................... H02J 5/005 307/104 |
| 2015/0280450 A1 | 10/2015 | Park et al. |
| 2016/0081240 A1* | 3/2016 | Lee ....................... H05K 9/0075 307/91 |
| 2016/0094051 A1* | 3/2016 | Soar ........................ H02J 50/12 307/9.1 |
| 2016/0254705 A1* | 9/2016 | Jung ....................... H02J 50/10 307/104 |
| 2016/0261142 A1* | 9/2016 | Park ........................ H01F 38/14 |
| 2016/0268842 A1* | 9/2016 | Wang ....................... H02J 9/005 |
| 2017/0310164 A1* | 10/2017 | Abdolkhani ............ H02J 7/025 |

OTHER PUBLICATIONS

International Search Report and Written Opinion for International Application No. PCT/FR2017/053515, dated Jan. 29, 2018—11 pages.

* cited by examiner

METHOD FOR CHARGING A MOBILE TERMINAL WITH A MOBILE DEVICE WITH WHICH A MOTOR VEHICLE IS INTENDED TO BE EQUIPPED AND ASSOCIATED CHARGING DEVICE

CROSS REFERENCE TO RELATED APPLICATIONS

This application is the U.S. National Phase Application of PCT International Application No. PCT/FR2017/053515, filed Dec. 12, 2017, which claims priority to French Patent Application No. 1662355, filed Dec. 13, 2016, the contents of such applications being incorporated by reference herein.

FIELD OF THE INVENTION

The present invention relates to a method and to a device for charging a mobile terminal through magnetic coupling. The present invention is applied with particular advantage, although without limitation, in charging devices housed on board motor vehicles.

BACKGROUND OF THE INVENTION

Magnetic coupling charging devices, which make it possible to wirelessly charge mobile terminals (mobile telephones, laptop computers, touchscreen tablets, digital cameras, etc.) are currently experiencing a significant growth.

As is conventional, a magnetic coupling charging device includes a conductor coil, called "primary antenna", which is connected to a charging module. During charging of a mobile terminal, the charging module forms a charging signal that makes it possible to channel an electric current, whose intensity varies over time, in the primary antenna. The primary antenna that is thus supplied forms a variable magnetic field.

The mobile terminal includes a reception module including a conductor coil, called "secondary antenna". When said secondary antenna is positioned in the variable magnetic field formed by the primary antenna, an electric current is induced in said secondary antenna. This electric current makes it possible to charge an electrical accumulator connected to the secondary antenna, thus supplying current to the mobile terminal.

Several types of magnetic coupling charging devices operating in accordance with the general principle described above are known, in particular those defined by:

the WPC (acronym for "Wireless Power Consortium") consortium, which defines what are known as "magnetic induction" charging devices, which use a charging frequency that is, in principle between 100 and 200 kilohertz (kHz), the A4WP (acronym for "Alliance for Wireless Power") consortium, which defines what are known as "magnetic resonance" charging devices, which use a charging frequency that is in principle between 6 and 7 megahertz (MHz).

To ensure interoperability with all mobile terminals, there is nowadays a need for bimodal magnetic coupling charging devices, that is to say devices that are compatible both with the needs defined by the WPC consortium and with the needs defined by the A4WP consortium.

However, primary antennas that are compatible with the needs of the WPC and A4WP consortia (for the sake of simplicity, we will give them the names WPC inductive primary antenna and A4WP resonant primary antenna hereinafter) have very different characteristics. In particular, WPC primary antennas are generally associated with a ferromagnetic body that may disrupt the operation of A4WP primary antennas, such that it is difficult to collocate WPC and A4WP primary antennas. The WPC and A4WP charging surfaces thus have to be remote, and there is therefore a constraint for positioning the mobile terminal depending on whether it is equipped with a WPC or A4WP reception module.

In addition, magnetic resonance charging requires high precision with regard to the impedance matching of the A4WP resonant primary antenna. Specifically, the presence of a mobile terminal close to the A4WP resonant primary antenna modifies the electrical parameters of said antenna and causes its resonant frequency to vary. This impedance modification reduces charging efficiency, and it is then necessary to match the impedance so that the resonant frequency of the A4WP resonant primary antenna is equal to an optimum resonant frequency for maximum charging efficiency.

One solution from the prior art consists in using a network consisting of a plurality of capacitors and switches connected in parallel, and connected to the A4WP resonant primary antenna, and in selecting one or more capacitors using corresponding switches in order to obtain the desired impedance of said antenna.

This solution is expensive and requires a complex strategy for switching the switches.

SUMMARY OF THE INVENTION

The aim of the present invention is to rectify all or some of the limitations of the solutions from the prior art, in particular those outlined above, by proposing a solution that makes it possible to have bimodal magnetic coupling charging devices having a single charging surface for the WPC and A4WP charging modules and also making it possible to match the impedance of the A4WP resonant primary antenna accurately, easily and inexpensively.

An aspect of the invention proposes a method for charging a mobile terminal using a charging device intended to be housed on board a motor vehicle, said charging device comprising at least one first so-called induction charging antenna, or "WPC" inductive primary antenna, having a charging frequency, and a second so-called resonance charging antenna, or "A4WP" resonant primary antenna, having a resonant frequency at least 1000 times higher than the charging frequency, a ferromagnetic body situated below and joined to the inductive primary antenna, the charging method being noteworthy in that it consists in:

equipping the ferromagnetic body and the inductive primary antenna beforehand with movement means able to move the ferromagnetic body and said inductive primary antenna with respect to the resonant primary antenna, detecting the mobile terminal on the charging surface, determining a type of charging between the charging device and the mobile terminal so as to trigger charging by the inductive primary antenna or the resonant primary antenna, moving the ferromagnetic body joined to the inductive primary antenna with respect to the resonant primary antenna, depending on the resonant frequency of said resonant primary antenna when the mobile terminal is charged by the resonant primary antenna, and moving the ferromagnetic body joined to the inductive primary antenna depending on the charging efficiency of the inductive primary antenna when the mobile terminal is charged by the inductive primary antenna.

More particularly:

the detection step and the determination step are performed by way of the resonant primary antenna, and the determination step comprises the resonant primary antenna sending an identifier request message to the mobile terminal, if a compatible identifier is received in return by the resonant primary antenna from the mobile terminal, the mobile terminal is charged by way of the resonant primary antenna, otherwise, the mobile terminal is charged by way of the inductive primary antenna.

In one preferred embodiment:

when the mobile terminal is charged by the resonant primary antenna, the movement of the ferromagnetic body joined to the inductive primary antenna stops only when the resonant frequency is contained within a window of predetermined values, and when the mobile terminal is charged by the inductive primary antenna, the movement of the ferromagnetic body joined to the inductive primary antenna stops only when the charging efficiency of the inductive primary antenna is higher than or equal to a predetermined threshold.

In one preferred embodiment, the movement of the inductive primary antenna and of the ferrite takes place in a plane parallel to the charging surface.

An aspect of the invention also relates to a device for charging a mobile terminal, intended to be housed on board a motor vehicle, said charging device comprising at least one first so-called induction charging antenna, or "WPC" inductive primary antenna, having a charging frequency, and a second so-called resonance charging antenna, or "A4WP" resonant primary antenna, having a resonant frequency at least 1000 times higher than the charging frequency, a ferromagnetic body situated below and joined to the inductive primary antenna, the charging device (D) being noteworthy in that it comprises:

Means for moving the ferromagnetic body joined to the inductive primary antenna, able to move the ferromagnetic body and the inductive primary antenna, Means for detecting the presence of the mobile terminal on the charging surface, Means for determining the type of charging, First means for measuring the resonant frequency of the resonant primary antenna, Second means for measuring the charging efficiency of the inductive primary antenna, First means for controlling the movement means depending on the resonant frequency, Second means for controlling the movement means depending on the charging efficiency, First means for comparing the resonant frequency of the resonant primary antenna and a minimum value and a maximum value of a window of predetermined values, Second means for comparing the charging efficiency of the inductive primary antenna and a predetermined threshold.

In one preferred embodiment, with the charging surface comprising a longitudinal axis and a transverse axis that intersect at a center, the resonant primary antenna is situated at the ends of the charging surface and the ferromagnetic body and the inductive primary antenna are able to move along the longitudinal axis from an initial position in which the inductive primary antenna or the ferrite has a center coincident with the center of the charging surface to a final position in which the inductive primary antenna or the ferrite is situated close to the resonant primary antenna at the ends of the charging surface.

Preferably, the resonant primary antenna fully or partly surrounds the inductive primary antenna.

Expediently, the movement of the inductive primary antenna and of the ferrite takes place in a plane parallel to the charging surface and the movement means comprise:

An electric motor, connected to

A drive system comprising at least two pulleys, around which a belt, joined to the ferromagnetic body, is driven in motion.

An aspect of the invention also applies to any motor vehicle comprising a charging device according to any one of the features listed above.

BRIEF DESCRIPTION OF THE DRAWINGS

Other aims, features and advantages of aspects of the invention will become apparent on reading the following description, by way of nonlimiting example, and on examining the appended drawings, in which.

DETAILED DESCRIPTION OF THE PREFERRED EMBODIMENTS

Figure 1:
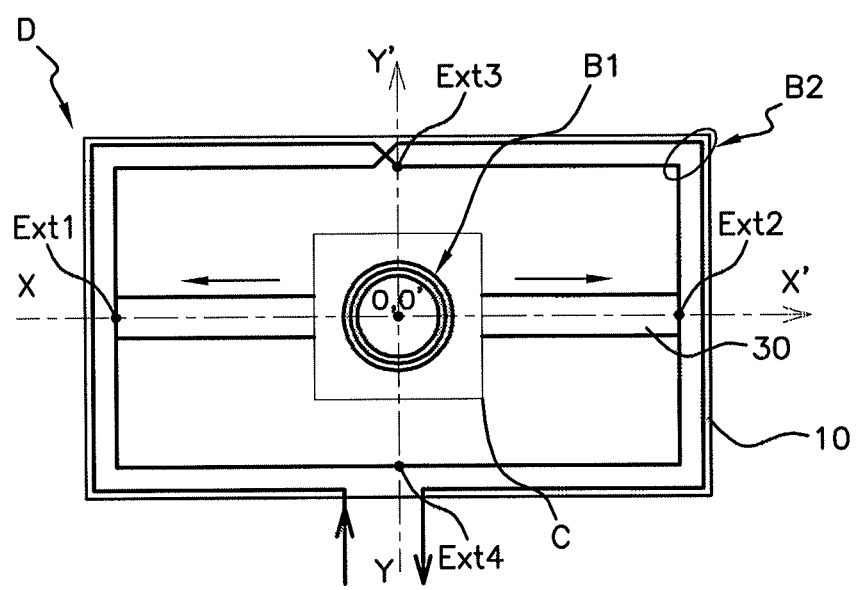
FIG. 1 schematically shows a cross-sectional plan view of a charging device D according to an aspect of the invention, FIG. 2 schematically shows a cross-sectional side view of a charging device D according to an aspect of the invention.
Figure 2:
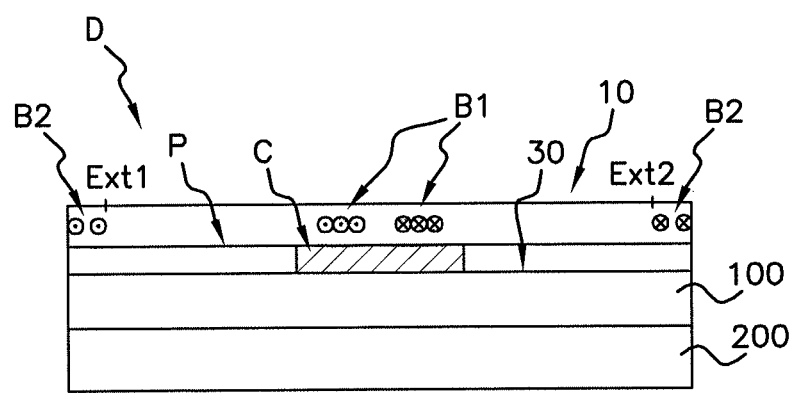
Figure 7:
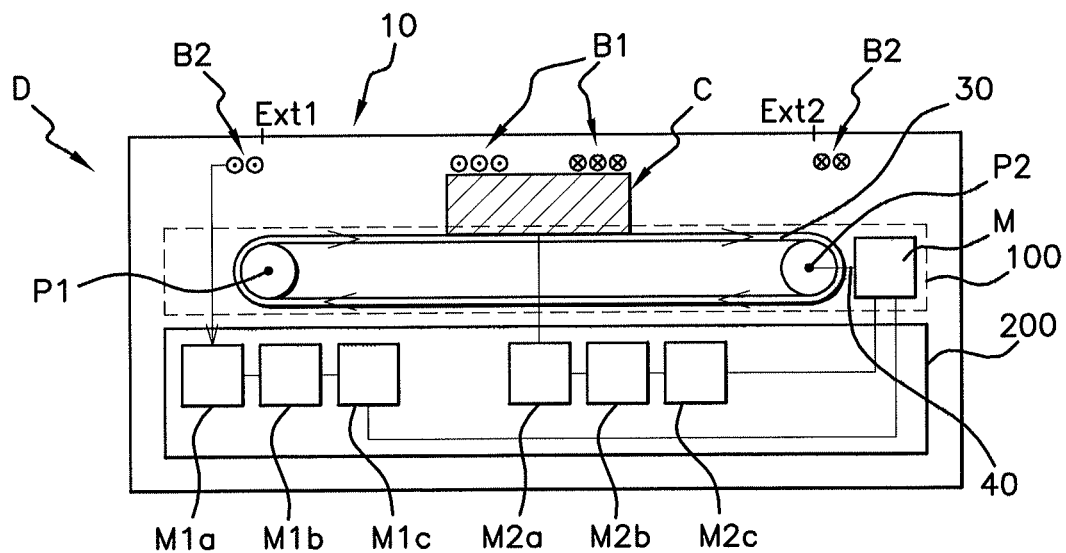

The charging device D of an aspect of the invention is illustrated in FIGS. 1, 2 and 7. Said device D is intended to be housed on board a motor vehicle so as to charge the battery of a mobile terminal (not shown in the figures) through magnetic coupling.

The charging device D is bimodal; more precisely, it makes it possible to charge "WPC"-compatible mobile terminals and "A4WP"-compatible mobile terminals, that is to say terminals that are able to be charged either through magnetic induction at a charging frequency between 100 and 200 kHz, or through magnetic resonance at a resonant frequency higher than a thousand times the charging frequency, for example between around 6 and 7 MHz.

To this end, the charging device D comprises, underneath a charging surface 10 intended to receive the mobile terminal:

an inductive primary antenna B1, in the form of a planar circular antenna, comprising a plurality of copper-wire windings, electrically connected to an inductive charging management system (not shown), generally contained in a microcontroller 200 situated in said device D, and underneath which antenna there is situated a ferromagnetic body C, joined to said antenna B1, a resonant primary antenna B2, in the form of copper-wire windings, situated at the periphery of the charging surface 10, connected to a resonant charging system (not shown), generally contained in a microcontroller 200 situated in the device D.

In one preferred embodiment of the invention, the charging device D, as illustrated in FIG. 1, is rectangular in shape, with a center O, at which two axes, a longitudinal axis XX' and a transverse axis YY', intersect. The resonant primary antenna B2 situated at the periphery of the charging device D, which is also rectangular in shape, is symmetrical about the two axes XX', YY' and is centered with respect to the center O of the charging device D. In this preferred embodiment, at least one winding or at least one loop of the resonant primary antenna B2 fully or partly surrounds the inductive primary antenna B1.

This exemplary embodiment is in no way limiting, and any shape and/or arrangement of the resonant primary antenna B2 in the charging device D may be contemplated. However, to ensure resonant charging efficiency, it is preferable for the antenna to be arranged such that it ensures efficient charging regardless of the position of the mobile terminal on the charging surface 10. An arrangement at the periphery of the charging surface 10 of the resonant primary antenna B2 thus makes it possible to charge the mobile terminal regardless of its position on the charging surface 10.

In order to implement an aspect of the invention, it is also necessary for at least one loop or one winding of the resonant primary antenna B2 to be adjacent to the inductive primary antenna B1, more precisely to the ferrite C, such that the impedance of the resonant primary antenna B2 varies when the inductive primary antenna B1 moves with respect to the resonant primary antenna B2 (this is explained below). However, given that the charging surfaces of inductive chargers housed on board motor vehicles have restricted sizes, it generally turns out that the two antennas, the resonant primary antenna B2 and the inductive primary antenna B1, are situated close to one another.

In order to implement an aspect of the invention, it is furthermore necessary for the two antennas, resonant primary antenna B2 and inductive primary antenna B1, not to each cover a surface area identical to the charging surface 10.

An aspect of the invention proposes for the assembly formed of the ferromagnetic body C and of the inductive primary antenna B1 to be mobile with respect to the resonant primary antenna B2, which resonant primary antenna is immobile and fixed in the device D.

To this end, according to an aspect of the invention, the device D furthermore comprises movement means 100 able to move the ferromagnetic body C and the inductive primary antenna B1 with respect to the resonant primary antenna B2.

In the preferred embodiment, the movement of the inductive primary antenna B1 and of the ferromagnetic body C takes place in a plane P (cf. FIG. 2) parallel to the charging surface 10. However, the movement could also take place in a plane perpendicular to the charging surface 10.

These movement means 100 may be formed, for example and as illustrated in FIG. 7, of an electric motor M, which is connected to a drive system comprising at least two pulleys P1, P2, by way of which a belt 30, situated below and joined to the ferrite C, which is itself joined to the inductive primary antenna B1, is driven in motion.

The electric motor M causes rotation of an output shaft 40 mechanically connected to at least one of the two pulleys P1, P2, which in turn drives the belt 30 in motion and the second pulley P2, P1. As the ferromagnetic body C is fixed and joined to the belt 30, said ferromagnetic body C is then also driven in motion by the belt 30. In this example, the belt 30 forms a loop around the two pulleys P1, P2, with one part forming a surface parallel to the charging surface 30 and situated below the ferromagnetic body C.

Of course, this example is in no way limiting, and an aspect of the invention also applies to all movement means known to those skilled in the art that are able to move the ferromagnetic body C joined to the inductive primary antenna B1 with respect to the resonant primary antenna B2 and in the plane P parallel to the charging surface 10, for example gear systems, driven in rotation by the electric motor M.

The two pulleys P1, P2 are advantageously situated at each of the two ends Ext1, Ext2 of the device D along a longitudinal axis XX' (cf. FIG. 1), that is to say, in the example illustrated in FIG. 1, at the ends of the charging surface 10. The pulleys P1, P2 and the belt 30 connecting the two pulleys thus make it possible to move the ferromagnetic body C and the inductive primary antenna B1 from a first end Ext1 to a second end Ext2, passing through the center O of the charging surface 10, along the longitudinal axis XX'.

As the resonant primary antenna B2 is situated at the periphery of the charging surface 10, that is to say at the ends Ext1 and Ext2 (and also Ext3, Ext4), when the ferromagnetic body C and the resonant primary antenna B1 move toward one or the other of the ends Ext1, Ext2, said ferromagnetic body C and said antenna B1 approach the resonant primary antenna B2, thus modifying the impedance of the resonant primary antenna B2.

Figure 3:
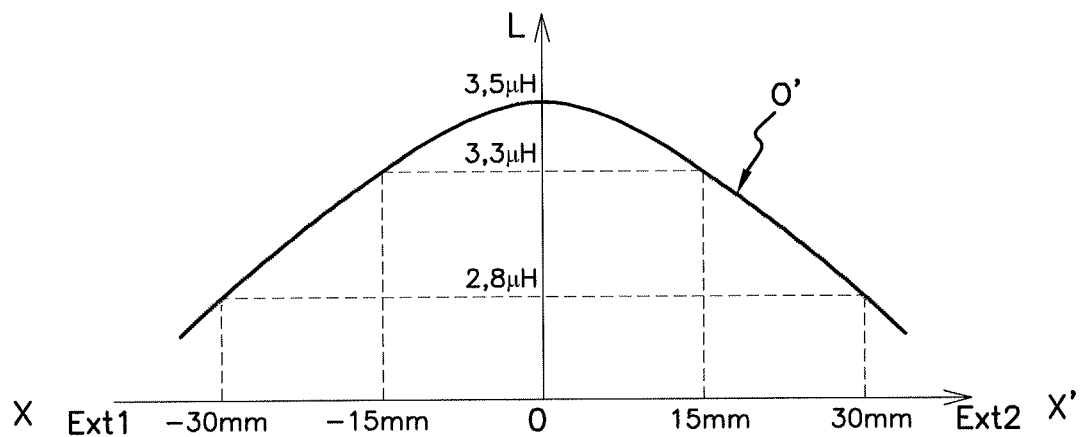
FIG. 3 shows a graph of the inductance variation of the A4WP resonant primary antenna, with center O, with respect to the position of the WPC inductive primary antenna, with center O'.

This is illustrated in FIG. 3, O being the center of the charging device D, and therefore of the resonant primary antenna B2, and considering O' to be the center of the inductive primary antenna B1; when the center O' approaches the center O, the inductance L of the resonant primary antenna B2 increases. When the centers O and O' are 30 mm apart, the inductance L is equal to 2.8 µH, and when the two centers O, O' coincide (zero distance between the two of them), the impedance is equal to 3.5 µH.

As a reference in FIG. 3, consideration has been given to the center O' of the inductive primary antenna B1, but a center O" of the ferrite (not shown) could have been considered as a reference, in the event that the inductive primary antenna B1 and the ferromagnetic body C are not centered.

This impedance variation causes the resonant frequency $F_R$ of the resonant primary antenna B2 to vary.

Figure 4:
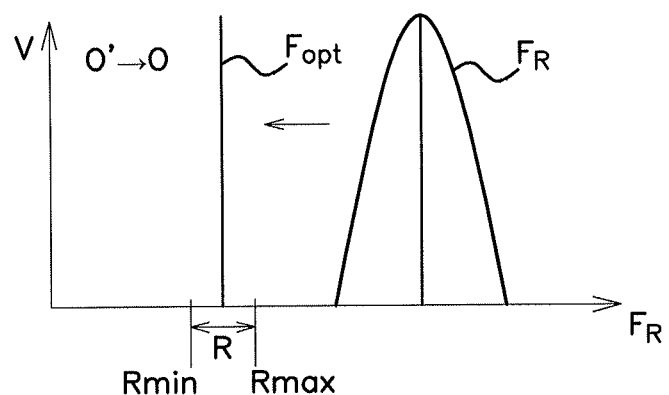
FIG. 4 is a graph illustrating the drop in the resonant frequency of the A4WP resonant primary antenna when the WPC inductive primary antenna approaches the center of the A4WP resonant primary antenna.
Figure 5:
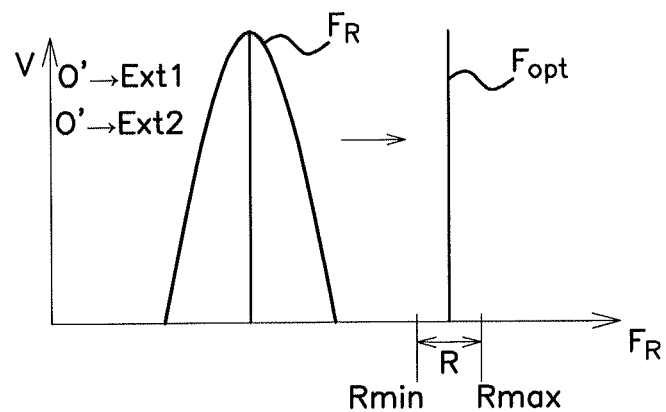
FIG. 5 is a graph illustrating the increase in the resonant frequency of the A4WP primary antenna when the WPC inductive primary antenna approaches the ends Ext1, Ext2 of the charging device D, that is to say when said WPC inductive primary antenna approaches the A4WP resonant primary antenna.

This is illustrated in FIGS. 4 and 5.

In FIG. 4, when the center O' of the inductive primary antenna B1 approaches the center O (or the center O" of the ferromagnetic body C) of the resonant primary antenna B2, the resonant frequency $F_R$ of the resonant primary antenna B2 decreases, and moves toward smaller values, this being illustrated by an arrow in FIG. 4.

In FIG. 5, when the center O' of the inductive primary antenna B1 (or the center O" of the ferromagnetic body C) approaches the resonant primary antenna B2, that is to say the ends Ext1, Ext2, the resonant frequency $F_R$ of the resonant primary antenna B2 increases and moves toward larger values, this being illustrated by an arrow in FIG. 5.

As described in the prior art, when a mobile terminal is placed on the charging surface 10, its presence modifies the impedance L of the resonant primary antenna B2 and therefore its resonant frequency $F_R$, which moves away from the optimum resonant frequency Fopt, this phenomenon being called "mismatching". In the prior art, it was known to use capacitors and switches to match the resonant frequency $F_R$ of the resonant primary antenna B2 each time a mobile terminal was detected on the charging surface 10, such that it was substantially equal to the optimum resonant frequency Fopt.

An aspect of the invention proposes here to use the movement of the ferromagnetic body C and of the inductive primary antenna B1 to match the resonant frequency $F_R$ of the resonant primary antenna B2 each time a mobile terminal is detected on the charging surface 10 and resonant charging is necessary, such that the resonant frequency $F_R$ is substantially equal to the optimum resonant frequency Fopt.

An aspect of the invention also ingeniously proposes to use as well the movement of the ferromagnetic body C and of the inductive primary antenna B1 so as to center the inductive primary antenna B1 with the mobile terminal and thus optimize charging efficiency when inductive charging is necessary.

Specifically, as the charging device D comprises just one single inductive primary antenna B1 for inductively charging the mobile terminal, when the mobile terminal is not centered with respect to said antenna, charging efficiency decreases.

Ingeniously, as the inductive primary antenna B1 and the ferromagnetic body C are mobile, moving them also makes it possible to center the inductive primary antenna B1 with respect to the mobile terminal so as to obtain maximum charging efficiency Q.

Thus, by making the inductive primary antenna B1 and the ferromagnetic body C associated therewith mobile, an aspect of the invention expediently makes it possible to move the assembly formed of these two elements so as to:
  modify the impedance L of the resonant primary antenna B2, and thus to adjust the resonant frequency $F_R$ of said antenna so as to be substantially equal to the optimum resonant frequency Fopt, when a mobile terminal is placed on the charging surface 10 and resonant charging is desired,
  center the inductive primary antenna B1 with respect to the mobile terminal (more precisely with respect to a receiver antenna situated in the mobile terminal) so as to optimize the charging efficiency Q of the inductive primary antenna B1, when a mobile terminal is detected on the charging surface 10 and inductive charging is desired.

To this end, the charging device D also comprises (cf. FIG. 7):
  First means M1a for measuring the resonant frequency $F_R$ of the resonant primary antenna B2,
  Second means M2a for measuring the charging efficiency of the inductive primary antenna B1,
  First means M1b for comparing the resonant frequency of the resonant primary antenna B2 and a minimum value Rmin and a maximum value Rmax of a predetermined value window R,
  Second means M2b for comparing the charging efficiency Q of the inductive primary antenna B1 and a predetermined threshold Qmin,
  First means M1c for controlling the movement means 100 depending on the resonant frequency $F_R$,
  Second means M2c for controlling the movement means 100 depending on the charging efficiency Q.

The first means M1a for measuring the resonant frequency consist in measuring the current of the resonant primary antenna B2 as a function of an applied frequency (for example between 6 MHz and 7 MHz, with a step of 0.1 MHz), the resonance corresponding to the frequency at which said current is highest. The first measurement means M1a therefore consist in measuring the voltage across the terminals for example of a resonant capacitor that is electrically connected to the resonant primary antenna B2, using an analog converter contained in the microcontroller 200. Once the value of this capacitor has been determined, it is then possible to derive therefrom the intensity of the current flowing through the resonant primary antenna B2 and then to determine the resonant frequency at which the current is highest. The measurement means M1a are known to those skilled in the art and will not be described in more detail here.

The second means M2a for measuring the charging efficiency consist in measuring a ratio between an active power received by the microcontroller 200 from the inductive primary antenna B1 and the power generated by the microcontroller 200, supplying said inductive primary antenna B1. The power received by the microcontroller 200 takes the form of a power line communication from the inductive primary antenna B1.

The means M2a for measuring the charging efficiency are known to those skilled in the art and will not be described in more detail here.

The first and second comparison means M1b, M2b consist of software modules.

The first means M1c and the second means M2c for controlling the movement means 100 consist of "step-by-step" generations of alternating phases for the electric motor. This allows precise and repeatable movement of the belt 30, that is to say of the inductive primary antenna B1.

The charging device D also comprises:
  Means (not shown in the figures) for detecting the presence of the mobile terminal on the charging surface 10, known to those skilled in the art, which consist of software means, for example a circuit for transmitting a "ping" to the mobile terminal and a circuit for receiving a message in return from the mobile terminal that confirms its presence on the charging surface 10, said means being contained in the microcontroller 200,
  Means (not shown in the figures) for determining the type of charging, which consist for example of software means, for example a circuit for transmitting an interrogation message through the resonant primary antenna B2 to the mobile terminal and a circuit for receiving an identifier from the mobile terminal. If this identifier is recognized by the resonant primary antenna B2, then the mobile terminal is compatible with resonant charging, and if the identifier is not recognized by the resonant primary antenna B2, then the mobile terminal is by default compatible with inductive charging. Of course, an identifier may then be exchanged between the inductive primary antenna B1 and the mobile terminal so as to confirm the compatibility of the type of charging between the mobile terminal and the inductive primary antenna B1. A selector, for example a switch or software means, then make(s) it possible to actuate the appropriate resonant or inductive charging circuit. Said means for determining the type of charging may be contained in the microcontroller 200.

Figure 6:
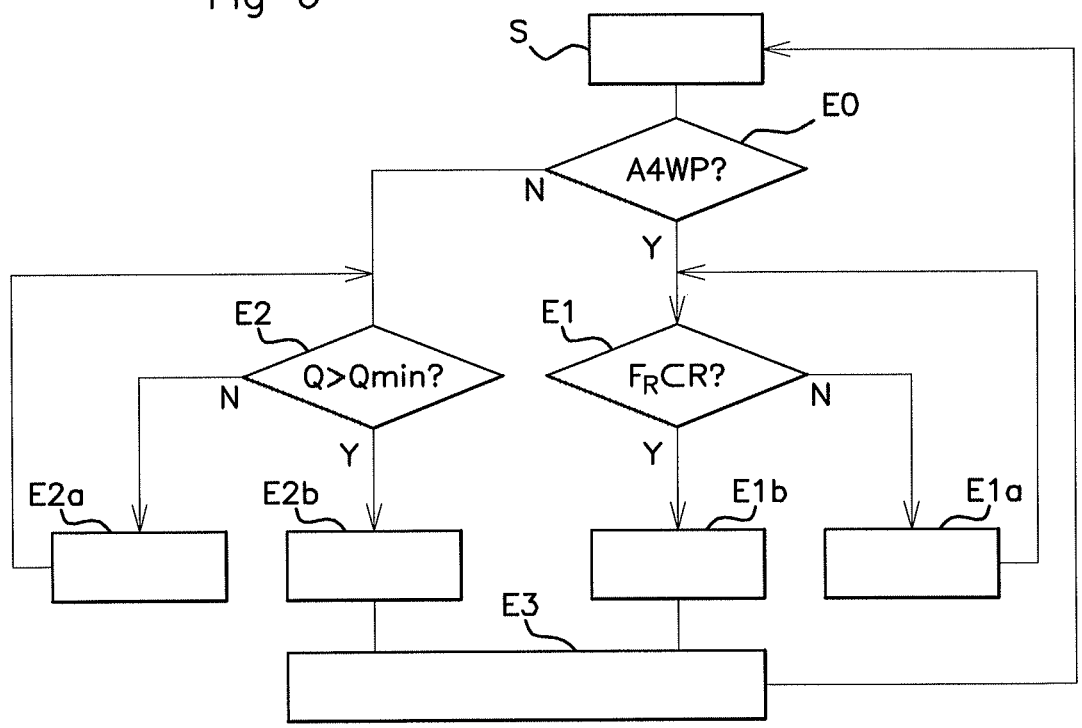
FIG. 6 is a flow chart showing the charging method according to an aspect of the invention, FIG. 7 schematically shows a detailed cross-sectional side view of one preferred embodiment of the charging device D according to an aspect of the invention.

The detection method illustrated in FIG. 6 will now be described.

In a preliminary step (step S), a mobile terminal is detected on the charging surface 10 of the charging device D. This detection is performed by virtue of sending "pings" or pulses of short duration through the inductive primary antenna B1 or through the resonant primary antenna B2 to the charging device D and of the reception of a return message from the mobile terminal if same is placed on the charging surface 10.

In a first determination step of the method (E0), once the mobile terminal has been detected, the method proposes to determine whether the mobile terminal is compatible with an inductive charging method or with a resonant charging method. This method for determining a type of charging is known from the prior art and will not be explained in detail. The two charging methods are primarily distinguished by the value of the quality factor Q of their respective antenna during charging.

For the purpose of determining the desired type of charging and the presence of the mobile terminal placed on the charging surface 10, the resonant primary antenna B2 periodically transmits an interrogation signal in the form of an electromagnetic pulse (for example every 150 ms). When a mobile terminal is positioned close to the resonant primary antenna B2, it modifies the electromagnetic field that is generated during the transmission of said interrogation signal. Once a terminal has been detected, and if it is compatible with the charging standard, the antenna B2 transmits an authentication request and the mobile terminal responds in return by sending a response signal containing its identifier and the state of its battery.

If the mobile terminal is compatible with resonant charging, then, in step E1, the first measurement means M1*a* measure the resonant frequency $F_R$ of the resonant primary antenna B2. The first comparison means M1*b* compare said frequency with a minimum value Rmin and a maximum value Rmax of a predetermined frequency window R (cf. FIGS. 4 and 5) situated around an optimum resonant frequency $F_{opt}$.

If the resonant frequency $F_R$ is contained within said window R, in other words if the resonant frequency $F_R$ is higher than the minimum value Rmin and if said resonant frequency $F_R$ is lower than the maximum value Rmax, then resonant charging begins (step E1*b*).

If the resonant frequency $F_R$ is not contained within said window R, then the first means M1*c* for controlling the movement means 100 control the movement of the ferromagnetic body C and of the inductive primary antenna B1 using the electric motor M, until the resonant frequency $F_R$ is contained within the predetermined frequency window R (step E1*a*). The movement stops when the resonant frequency $F_R$ is situated in the desired frequency window R, and then resonant charging begins (step E1*b*).

Similarly, if the mobile terminal is compatible with inductive charging, then in step E2, the second measurement means M2*a* measure the charging efficiency Q of the inductive primary antenna B1, and the second comparison means M2*b* compare the efficiency Q thus measured with a threshold, equal to a minimum efficiency Qmin.

If the measured efficiency Q is higher than or equal to the threshold Qmin, then inductive charging begins (step E2*b*).

If the measured efficiency Q is lower than said threshold Qmin, then the second means M2*c* for controlling the movement means control the movement of the ferromagnetic body C and of the inductive primary antenna B1 using the electric motor M, until the charging efficiency Q is higher than or equal to the threshold Qmin (step E2*a*). The movement stops when the charging efficiency Q is higher than or equal to the threshold Qmin, and then inductive charging begins (step E2*b*).

When the inductive or resonant charging has finished (step E3), the method returns to the preliminary step S.

By moving the assembly formed of the inductive primary antenna B1 and of the ferromagnetic body C, an aspect of the invention expediently makes it possible to rectify two problems, when the mobile terminal is positioned on the charging surface 10 of the "bimodal" charging device D:

If the mobile terminal is compatible with resonant charging: the mismatching of the resonant frequency $F_R$ of the resonant primary antenna B2 to a resonant frequency value remote from the optimum resonant frequency value Fopt, If the mobile terminal is compatible with inductive charging: the drop in charging efficiency Q if the mobile terminal and the inductive primary antenna B1 are not centered.

By making this assembly (ferromagnetic body and inductive primary antenna B1) mobile, optimum charging efficiency q is ensured for inductive charging and the optimum resonant frequency fopt is ensured for resonant charging, regardless of the type of mobile terminal and regardless of its position on the charging surface 10 of the charging device D.

Aspects of the invention are ingenious and easy to implement as it requires only inexpensive movement means and software means.

The invention claimed is:

1. A method for charging a mobile terminal using a charging device configured to be housed on board a motor vehicle, said charging device comprising at least one first induction charging antenna, having a charging frequency, and a second resonance charging antenna, or having a resonant frequency at least 1000 times higher than the charging frequency, a ferromagnetic body situated below and joined to the inductive primary antenna, the charging method comprising:

equipping the ferromagnetic body and the inductive primary antenna beforehand with movement means able to move the ferromagnetic body and said inductive primary antenna with respect to the resonant primary antenna, detecting the mobile terminal on a charging surface, determining a type of charging between the charging device and the mobile terminal so as to trigger charging by the inductive primary antenna or the resonant primary antenna, moving the ferromagnetic body joined to the inductive primary antenna with respect to the resonant primary antenna, depending on the resonant frequency of said resonant primary antenna when the mobile terminal is charged by the resonant primary antenna, and moving the ferromagnetic body joined to the inductive primary antenna depending on a charging efficiency of the inductive primary antenna when the mobile terminal is charged by the inductive primary antenna.

2. The charging method as claimed in claim 1, wherein:
   the detection step and the determination step are performed by way of the resonant primary antenna, and
   the determination step comprises the resonant primary antenna sending an identifier request message to the mobile terminal, if a compatible identifier is received in return by the resonant primary antenna from the mobile terminal, the mobile terminal is charged by way of the resonant primary antenna, otherwise, the mobile terminal is charged by way of the inductive primary antenna.

3. The charging method as claimed in claim 2, wherein, when the mobile terminal is charged by the resonant primary antenna, the movement of the ferromagnetic body joined to the inductive primary antenna stops only when the resonant frequency is contained within a window of predetermined values, and when the mobile terminal is charged by the inductive primary antenna, the movement of the ferromagnetic body joined to the inductive primary antenna stops only when the charging efficiency of the inductive primary antenna is higher than or equal to a predetermined threshold.

4. The method as claimed in claim 1, wherein the movement of the inductive primary antenna and of the ferromagnetic body takes place in a plane parallel to the charging surface.

5. A charging device for charging a mobile terminal, configured to be housed on board a motor vehicle, said charging device comprising at least one first induction charging antenna, having a charging frequency, and a second resonance charging antenna, having a resonant frequency at least 1000 times higher than the charging frequency, a ferromagnetic body situated below and joined to the inductive primary antenna, the charging device comprising:

movement means for moving the ferromagnetic body joined to the inductive primary antenna, able to move the ferromagnetic body and the inductive primary antenna, and a microcontroller configured to:
detect the presence of the mobile terminal on a charging surface,
determine a type of charging,
measure a resonant frequency of the resonant primary antenna,
measure a charging efficiency of the inductive primary antenna,
control the movement means depending on the resonant frequency,
control the movement means depending on the charging efficiency,
compare the resonant frequency of the resonant primary antenna and a minimum value and a maximum value of a window of predetermined values, and
compare the charging efficiency of the inductive primary antenna and a predetermined threshold.

6. The charging device as claimed in claim 5, wherein, with the charging surface comprising a longitudinal axis and a transverse axis that intersect at a center, the resonant primary antenna is situated at ends of the charging surface and the ferromagnetic body and the inductive primary antenna are configured to move along the longitudinal axis from an initial position in which the inductive primary antenna or the ferromagnetic body has a center coincident with a center of the charging surface to a final position in which the inductive primary antenna or the ferromagnetic body is situated close to the resonant primary antenna at the ends of the charging surface.

7. The charging device as claimed in claim 5, wherein the resonant primary antenna fully or partly surrounds the inductive primary antenna.

8. The charging device as claimed in claim 5, wherein the movement of the inductive primary antenna and of the ferromagnetic body takes place in a plane parallel to the charging surface and in that the movement means comprise:
an electric motor, and
a drive system comprising at least two pulleys, around which a belt, joined to the ferromagnetic body, is driven in motion.

9. A motor vehicle, comprising a charging device as claimed in claim 5.

10. The charging method as claimed in claim 1, wherein, when the mobile terminal is charged by the resonant primary antenna, the movement of the ferromagnetic body joined to the inductive primary antenna stops only when the resonant frequency is contained within a window of predetermined values, and when the mobile terminal is charged by the inductive primary antenna, the movement of the ferromagnetic body joined to the inductive primary antenna stops only when the charging efficiency of the inductive primary antenna is higher than or equal to a predetermined threshold.

11. The charging device as claimed in claim 6, wherein the resonant primary antenna fully or partly surrounds the inductive primary antenna.

* * * * *